N. S. SIBERT.
CORN PLANTER.
APPLICATION FILED AUG. 5, 1910.
986,513.
Patented Mar. 14, 1911.
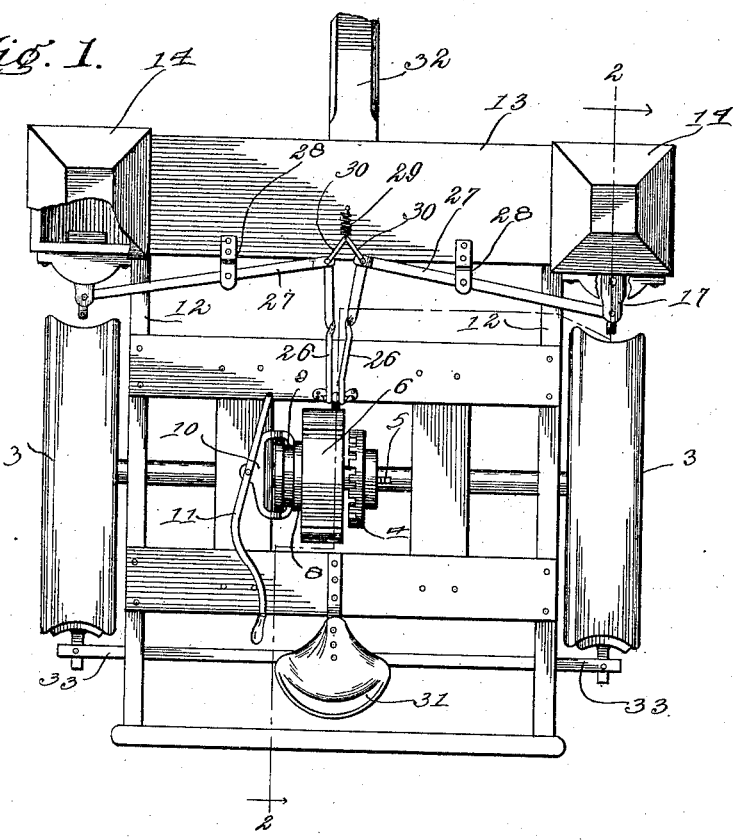
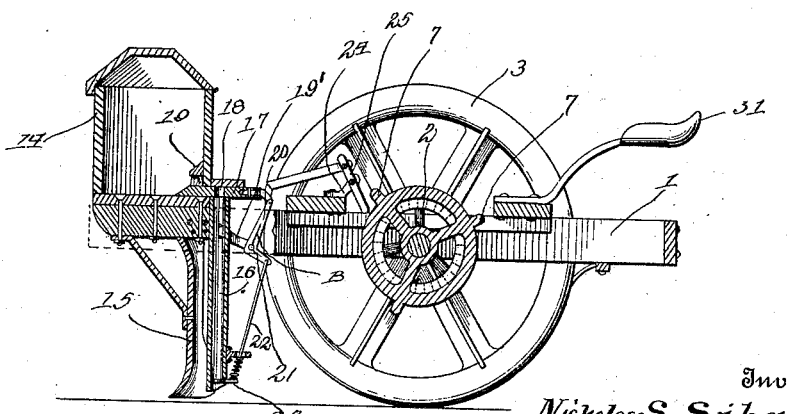
Witnesses
Frederick L. Fox.
Wm. Bagger
Inventor
Nicholas S. Sibert.
By Victor J. Evans
Attorney

UNITED STATES PATENT OFFICE.

NICHOLAS S. SIBERT, OF NEODESHA, KANSAS.

CORN-PLANTER.

986,513.  Specification of Letters Patent.  Patented Mar. 14, 1911.

Application filed August 5, 1910. Serial No. 575,702.

*To all whom it may concern:*

Be it known that I, NICHOLAS S. SIBERT, a citizen of the United States of America, residing at Neodesha, in the county of Wilson and State of Kansas, have invented new and useful Improvements in Corn-Planters, of which the following is a specification.

This invention relates to corn planters, and it has for its object to produce a planter of simple, inexpensive and compact construction whereby the seed shall be deposited in hills at the desired distances apart.

A further object of the invention is to produce a simple and effective construction whereby the planting mechanism may be thrown into or out of gear when desired.

Still further objects of the invention are to simplify and improve the general construction and operation of a device of the character outlined above.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a top plan view of a corn planter constructed in accordance with the invention, a portion of one of the seed boxes having been broken away. Fig. 2 is a longitudinal vertical sectional elevation.

Corresponding parts in the several figures are denoted by like characters of reference.

The frame 1 of the improved corn planter is mounted upon an axle 2 having ground wheels 3 which act in the usual manner to cover the seed and to compress the soil. One of the wheels is fixed upon the axle which will thus be compelled to revolve in its bearings when the machine is in motion. The axle carries a clutch member 4 which is fixed thereon by means of a key 5. The axle also carries a movable or slidable clutch member consisting of a wheel or drum 6 having a toothed recess adapted to engage the toothed clutch member 4, as indicated in dotted lines in Fig. 2. Said drum or clutch member is also provided with radially extending wings or tappets 7 which may be suitably spaced apart and of which any desired number may be employed. The drum or clutch member 6 has a hub or collar 8 provided with an annular groove 9 engaged by a yoke 10 carried by a shipping lever 11 which is fulcrumed upon the frame of the machine whereby it may be moved along the axle to place it into or out of engagement with the clutch member 4. The drum 6 is obviously loose upon the axle with which it may be connected for rotation by the clutch member 4.

The frame of the machine includes forwardly extending arms 12 carrying a cross piece 13 which supports the seed boxes 14. The furrow openers 15 are suitably supported beneath the seed boxes, and downwardly extending seed tubes 16 are provided, said seed tubes being disposed in rear of the seed boxes. Seed slides 17, see Fig. 2, are supported for reciprocation adjacent to the upper ends of the seed tubes, each of said slides being provided with a seed cup 18 which, when the slide is moved forwardly, is projected into the box where it receives a charge of seed. When the seed slide moves in a rearward direction, the cut-off or brush 19 within the seed box serves to remove superfluous seeds, the charge being discharged into the seed tube.

The rear side of each seed tube is provided with a bracket 19' upon which is fulcrumed a bell crank B, one arm of which, 20, is suitably connected with a seed slide 17. The other arm 21 of the bell crank is connected by means of a link 22 with a spring actuated foot valve 23 which is mounted in the lower end of the seed tube and which serves to temporarily support the charge of seed discharged into the seed tube from the slide.

The frame of the machine has a bracket 24 upon which is fulcrumed a lever 25 which is connected by means of links 26 with the inner ends of levers 27 which are fulcrumed upon brackets 28 extending rearwardly from the cross piece 13. The outer ends of the levers 27 are suitably connected with the seed slides 17 which are actuated thereby. The lower end of the lever 25 lies in the path of the tappets 7 extending from the wheel or drum 6, and said tappets will thus serve through the medium of the lever 25, links 26 and levers 27 to project the seed slides into the seed boxes against the tension of a spring 29, one end of which is connected by links 30 with the inner ends of the levers 27. Immediately upon the disengagement of a tappet from the lever 25, the spring 29 will restore the parts to initial position, projecting the seed slides outwardly from the seed boxes and causing charges of seed to be delivered into the seed tubes, the foot valves 23 of which are at this time in obstructing position. When a tappet 7 again engages the lever 25, the seed slides will be again projected into the seed boxes and through the medium of the bell cranks B, the foot valves will be opened against the tension of their actuating springs, thus causing the charges of seed to be dropped into the furrows opened by the opening members 15.

A seat 31 is provided for the driver, said seat being located in such a position as to make the shipping lever 11 conveniently accessible, it being obvious that when the drum 6 is disengaged from the clutch member 5, it will remain stationary when the machine is in motion, thus throwing the seed dropping mechanism out of gear. A tongue 32, scraper 33 and other accessories may be provided, but these are customary in machines of this class and need not be described in detail.

As will be seen from the foregoing description, taken in connection with the drawing hereto annexed, a machine of simple and efficient construction has been provided, whereby corn may be deposited in hills at regular intervals, as is desirable in order to facilitate future cultivation of the crop.

Having thus described the invention, what is claimed as new, is:—

1. In a corn planter, a frame having forwardly extending arms, a cross piece supported upon said arms, seed boxes mounted upon the cross piece, furrow openers supported upon the underside of the cross piece, seed tubes arranged in rear of the seed boxes, reciprocatory seed slides operating in the seed boxes and above the seed tubes, bell cranks supported upon the seed tubes and having upwardly extending arms connected with the seed slides, spring-actuated foot valves in the seed tubes, links connecting said valves with arms of the bell cranks, brackets extending rearwardly from the cross piece, levers fulcrumed upon said brackets and connected at their outer ends with the seed slides, spring means engaging the inner ends of the levers to actuate the latter to project the seed slides from the seed boxes, and means for actuating said levers against the tension of the spring.

2. In a corn planter, a frame having forwardly extending arms, a cross piece supported upon said arms, seed boxes mounted upon the cross piece, furrow openers supported upon the underside of the cross piece, seed tubes arranged in rear of the seed boxes, reciprocatory seed slides operating in the seed boxes and above the seed tubes, bell cranks supported upon the seed tubes and having upwardly extending arms connected with the seed slides, spring-actuated foot valves in the seed tubes, links connecting said valves with arms of the bell cranks, brackets extending rearwardly from the cross piece, levers fulcrumed upon said brackets and connected at their outer ends with the seed slides, spring means engaging the inner ends of the levers to actuate the latter to project the seed slides from the seed boxes, a wheel carrying axle supporting the frame, a clutch member fixed on the axle, a drum loosely engaging the axle and having a clutch face to engage the fixed clutch member, a shipping lever to move the drum, tappet members extending from the drum, a lever fulcrumed upon the frame and having one arm lying in the path of the tappet members, and links connecting the other arm of the lever with the spring-actuated levers connected with the seed slides.

In testimony whereof I affix my signature in presence of two witnesses.

NICHOLAS S. SIBERT.

Witnesses:
C. A. WALKER,
JOHN KIMBALL.

Copies of this patent may be obtained for five cents each, by addressing the "Commissioner of Patents Washington, D. C."